US007381514B2

(12) United States Patent
Bluett et al.

(10) Patent No.: US 7,381,514 B2
(45) **Date of Patent: *Jun. 3, 2008**

(54) STABILIZATION OF FLUORINATED SILICONE FUSER RELEASE AGENTS USING MERCAPTO FUNCTIONAL SILICONES

(75) Inventors: Lynn J. Bluett, Rochester, NY (US); Samuel Kaplan, Walworth, NY (US); Alexander N. Klymachyov, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 432 days.

This patent is subject to a terminal disclaimer.

(21) Appl. No.: 11/054,086

(22) Filed: Feb. 8, 2005

(65) Prior Publication Data

US 2006/0177758 A1 Aug. 10, 2006

(51) Int. Cl.
*G03G 13/20* (2006.01)
*B32B 25/20* (2006.01)

(52) U.S. Cl. .......................... 430/124.3; 430/124.33; 430/124.35; 399/333; 492/56; 428/447; 428/421

(58) Field of Classification Search ............ 430/124.3, 430/124.33, 124.35; 399/333; 492/56; 428/447, 428/421

See application file for complete search history.

(56) References Cited

U.S. PATENT DOCUMENTS 4,029,827 A 6/1977 Imperial et al. .............. 427/22

(Continued)

*Primary Examiner*—Mark A Chapman
(74) *Attorney, Agent, or Firm*—Annette L. Bade

(57) ABSTRACT

A fuser member having a substrate, an outer layer with a fluoropolymer, and a release agent material coating on the outer layer, wherein the release agent material coating contains (a) a blend with a mercapto functional release agent having the following formula II:

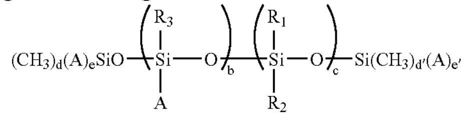

wherein A represents —$R_4$—X, wherein $R_4$ represents an alkyl group having from about 1 to about 10 carbons, X represents —SH; $R_1$ and $R_2$ are the same or different and each is selected from the group consisting of an alkyl having from about 1 to about 25 carbons, an aryl having from about 4 to about 10 carbons, and an arylalkyl; $R_3$ is selected from the group consisting of an alkyl having from about 1 to about 25 carbons, an aryl having from about 4 to about 10 carbons, an arylalkyl, and a substituted diorganosiloxane chain having from about 1 to about 500 siloxane units; b and c are numbers and are the same or different and each satisfy the conditions of $1 \leqq b \leqq 10$ and $10 \leqq c \leqq 1{,}000$ d and d' are numbers and are the same or different and are 2 or 3, and e and e' are numbers and are the same or different and are 0 or 1 and satisfy the conditions that d+e=3 and d'+e'=3 and (b) a fluorinated silicone release agent having the following Formula I:

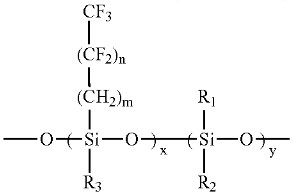

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula —$(CH_2)_o$—$(CF_2)_p$—$CF_3$ wherein o is a number of from about 0 to about 25 and p is a number of from about 1 to about 25.

18 Claims, 5 Drawing Sheets

U.S. PATENT DOCUMENTS

| | | | | |
|---|---|---|---|---|
| 4,251,277 | A | 2/1981 | Martin | 106/38.22 |
| 4,515,884 | A | 5/1985 | Field et al. | 430/99 |
| 4,968,766 | A | 11/1990 | Kendziorski | 528/32 |
| 5,217,837 | A | 6/1993 | Henry et al. | 430/124 |
| 5,366,772 | A | 11/1994 | Badesha et al. | 428/35.8 |
| 5,395,725 | A | 3/1995 | Bluett et al. | 430/124 |
| 5,568,239 | A | 10/1996 | Furukawa et al. | 355/284 |
| 5,624,780 | A | 4/1997 | Nishimori et al. | 430/124 |
| 5,627,000 | A | 5/1997 | Hamazaki et al. | 430/99 |
| 5,636,012 | A | 6/1997 | Uneme et al. | 399/325 |
| 5,698,320 | A | 12/1997 | Ebisu et al. | 428/373 |
| 5,716,747 | A | 2/1998 | Uneme et al. | 430/124 |
| 5,757,214 | A | 5/1998 | Stoddard et al. | 327/110 |
| 6,197,989 | B1 | 3/2001 | Furukawa et al. | 556/450 |
| 6,808,814 | B2 * | 10/2004 | Kaplan et al. | 428/447 |

* cited by examiner

STABILIZATION OF FLUORINATED SILICONE FUSER RELEASE AGENTS USING MERCAPTO FUNCTIONAL SILICONES

BACKGROUND

Herein are described fuser members useful in electrostatographic apparatuses, including printers, copiers, image-on-image, digital, and other apparatuses. More specifically, described are compositions and processes which are effective in minimizing or eliminating volatile emissions from the heated fuser oil composition during thermal and/or pressure fusing operations. The compositions which are particularly effective as volatile emission inhibitors or suppressants and as release agents for a variety of metal, elastomeric, or composite fuser substrates contain blends comprising a mercapto functional release agent and a polydimethylsiloxane fuser agent comprising fluoro-functional groups.

The use of polymeric release agents having functional groups, which interact with a fuser member to form a thermally stable, renewable self-cleaning layer having good release properties for electroscopic thermoplastic resin toners, is described in U.S. Pat. Nos. 4,029,827; 4,101,686; and 4,185,140, the disclosures each of which are incorporated by reference herein in their entirety. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether and mercapto groups as release fluids. U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer. U.S. Pat. No. 5,698,320 discloses the use of fluorosilicone polymers for use on fixing rollers with outermost layers of perfluoroalkoxy and tetrafluoroethylene resins.

Examples of release agents for fuser members are non-functional silicone release oils, mercapto-functional silicone release oils, and amino-functional silicone release oils. However, depending on the type of outer layer of the fuser member chosen, there may be several drawbacks to using nonfunctional, mercapto-functional, or amino-functional silicone oils as release agents. For example, for silicone rubber outer layers, the silicone release agents provide adequate wetting of the silicone rubber surface. However, the nonfunctional and functional silicone release agents can swell the silicone rubber coating. Swelling shortens roll life because it weakens the silicone, resulting in rapid mechanical wear. High viscosity (13,000 cS) nonfunctional fluids are currently used with silicone rolls, because these fluids do not swell the rolls as much as lower viscosity (100-350 cS) oils. However, high viscosity oils present fluid management problems and do not wet the fuser as efficiently.

On the other hand, fluoroelastomers used as an outer coating for fuser members are more durable and abrasion resistant than silicone rubber fuser members. Also, fluoroelastomer outer coatings do not swell when contacted by nonfunctional or functional silicone fluids. Therefore, fluoroelastomers are the current desired outer fuser member coating.

Various compositions have been proposed for treating fuser roll and belt substrates to impart release properties thereto. However, many of these compositions, in particular those comprised of organopolysiloxanes and various derivatives thereof, suffer from thermal instability when heated to fusing temperatures, for example about 150° C. and above for short periods of time of, for example, about 0.5 seconds and longer. Thermal degradation of organopolysiloxane release agents, such as dimethylsilicone oils and related derivatives may result in the generation of volatile byproducts, for example, formaldehyde ($CH_2{=}O$), formic acid ($HCO_2H$), carbon dioxide ($CO_2$), carbon monoxide (CO), hydrogen ($H_2$), methanol ($CH_3OH$), ammonia ($NH_3$), hydrogen sulfide ($H_2S$), trifluoropropionaldehyde ($CF_3CH_2CH{=}O$), and the like, which byproducts have potentially objectionable odor and may be mucousal irritants in the ambient environment of an operating xerographic machine. The byproducts may also be harmful to machine components and subsystems, such as photoreceptor or fuser members, promoting premature failure. Further, the byproducts may remain dissolved in the release agent oil and may promote continued or accelerated degradation of the silicone release agent oil composition thereby leading to undesirable changes in release agent viscosity, release properties, and perhaps negatively impacting optimal fusing performance of the fusing subsystem. The volatile emissions also have an unpleasant odor and are potentially hazardous to machine operators or passersby, particularly with prolonged exposure. Volatile emissions from fused copy or prints, that is volatiles that are dissolved in the release agent oil, may become imbibed into paper fibers, synthetic receiver sheet materials, or fixed toner images, and may outgas over time and may further pose an objectionable odor or irritation problem which may lead to reduced customer acceptance and satisfaction.

Other sources of volatile emission components include residuals from preparative reactions or purification processes residing in the oil itself, such as solvents, monomers, initiators, impurities, and the like; and degradation products arising from various oil performance additives. Commercial manufacturers and suppliers of silicone release agent oil products routinely employ additional processing steps to purposely "devolatilize" their products in recognition of volatile emissions being a problem for corrosion or contamination of mechanical and electrical machine components.

Antioxidant additives for silicone fluids are known. J. M. Nielsen in "Stabilization of Polymers and Stabilizer Processes", Advances in Chemistry Series, Vol. 85, American Chemical Society, Washington D.C., 1968, provides an early account of antioxidant additives for silicone fluids including, for example, redox metal complexes and soaps which are however disadvantaged by producing haze, gels or sludge on storage and or during use, and interfering with copy quality and color print fidelity.

T. S. Heu in Journal of the Korean Rubber Society, Vol. 18, No. 1, pages 21 to 29 (1983) describes the stability and degradation prevention of silicone oils and rubbers. Silicone compound stability is categorized into oxidation stability and thermal stability. Oxidation stability refers to resistance of the silicone compound to react with oxygen which reactions lead to intermolecular cross-linking and increased viscosity for silicone liquids and hardening for silicone rubbers. Thermal stability refers to the resistance of the silicone compound to undergo intramolecular cleavage of siloxane bonds (Si—O—Si) by heat, which reactions produce lower molecular weight products and leads to reduced viscosity for silicone oils and softening of silicone rubbers. Resistance to both pathways of degradation is called thermal oxidation stability. Homologous hydrocarbon structural derivatives of dimethyl polysiloxanes such as ethyl, propyl, butyl, and the like, generally possess lower thermal stability than the dimethyl compound. Certain structural derivatives of polysiloxanes have enhanced thermal stability, for example, phenyl methyl siloxane, but these derivatives are disadvantaged by their higher cost and thermal degradation liberates benzene. Thermal stability for silicone oils having the same repeat unit is generally higher for the oil with the greater molecular weight.

Additives made from, for example, salts of organometallic acids are commonly used to improve the thermal oxidation stability of silicone oils. However, these salts chemically react with the silicone oil in a multitude of ways as part of the stabilization mechanism and therefore unpredictably lead to oils having significantly altered physical, for example, viscosity and performance, for example, release properties.

U.S. Pat. No. 4,029,827, to Imperial et al, discloses polyorganosiloxanes having functional mercapto groups, which are applied to a heated fuser member in an electrostatic reproducing apparatus to form a thermally stable, renewable, self-cleaning layer having superior toner release properties for electroscopic thermoplastic resin toners.

U.S. Pat. No. 5,217,837 discloses a release agent having functional groups.

U.S. Pat. No. 5,366,772 discloses a fuser member with a hybrid polymeric network outer layer comprising a haloelastomer, coupling agent, functional polyorganosiloxane and crosslinking agent.

U.S. Pat. No. 4,251,277, to Martin, discloses compositions containing organopolysiloxanes and thiofunctional polysiloxanes having at least one mercaptan group, which are effective as corrosion inhibitors and as release agents for metal substrates.

U.S. Pat. No. 4,515,884 to Field et al, discloses a method of fusing by providing a silicone elastomer fusing surface, heating the fuser member to fuse toner particles to the receiver substrate, applying directly to the silicone elastomer fusing surface in non-emulsified form an unblended polydimethylsiloxane having a viscosity of about 7,000 to about 20,000 centistokes, and contacting the toner image on the substrate with the toner release agent which includes an unblended polydimethyl siloxane.

U.S. Pat. No. 5,395,725 to Bluett, et al, discloses use of mercapto-functional fuser agent to non-mercapto release agent to reduce formaldehyde emissions, wherein the non-mercapto release agent may be amino-functional, phenylmethyl siloxane, trifluoropropyl-functional, or non-functional polydimethylsiloxane release agent.

U.S. Pat. No. 6,197,989 B1 to Furukawa et al. discloses a fluorine-containing organic silicone compound represented by a formula.

U.S. Pat. No. 5,757,214 to Kato et al. discloses a method for forming color images by applying a compound which contains a fluorine atoms and/or silicon atom to the surface of electrophotographic light-sensitive elements.

U.S. Pat. No. 5,716,747 to Uneme et al. discloses a fluororesin coated fixing device with a coating of a fluorine containing silicone oil.

U.S. Pat. No. 5,698,320 to Ebisu et al. discloses a fixing device coated with a fluororesin, and having a fluorosilicone polymer release agent.

U.S. Pat. No. 5,636,012 to Uneme et al. discloses a fixing device having a fluororesin layer surface, and using a fluorine-containing silicone oil as a repellant oil.

U.S. Pat. No. 5,627,000 to Yamazaki et al. discloses a fixing method having a silicone oil coated on the surface of the heat member, wherein the silicone oil is a fluorine-containing silicone oil and has a specific formula.

U.S. Pat. No. 5,624,780 to Nishimori et al. discloses a fixing member having a fluorine-containing silicone oil coated thereon, wherein the silicone oil has a specific formula.

U.S. Pat. No. 5,568,239 to Furukawa et al. discloses a stain proofing oil for heat fixing, wherein the fluorine-containing oil has a specific formula.

U.S. Pat. No. 4,968,766 to Kendziorski discloses a fluorosilicone polymer for coating compositions for longer bath life.

In electrostatic and xerographic applications, it is desirable to use release agent oils which are cost effective; clear; colorless; odorless or nearly so at room temperature and at fuser operating temperatures; free of additives such as acids, bases, peroxides, heavy metals, and the like, that can interfere with the fusing and sheet release performance of the fusing system and associated hardware; and free of or produce minimal volatile emission component(s) over the service life of the release agent oil.

A mercapto functional release agent has been found, which decreases or eliminates the production of formaldehyde byproducts. In fact, U.S. Pat. No. 5,395,725 to Bluett, et al., described above, teaches the addition of mercaptopropyl functional fuser agent to polydimethyl siloxanes and aminopropyl-substituted polydimethyl siloxanes to inhibit the formation of formaldehyde.

In the case of fluorofunctional organopolysiloxane fuser release fluids, there remains a need for improved oxidative or thermal stability to minimize or eliminate the emission of potentially hazardous volatile compounds, such as fluoroaldehydes, at fuser operating temperatures. It is desirable to achieve the need without diminishing the release properties of the oil or compromising the print quality.

SUMMARY

Embodiments include a fuser member comprising a substrate; an outer layer comprising a fluoropolymer and a release agent material coating on the outer layer, wherein the release agent material coating comprises a blend comprising a mercapto functional release agent and a fluorinated silicone release agent having the following Formula I:

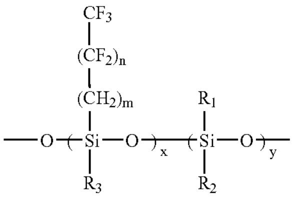

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula $-(CH_2)_o-(CF_2)_p-CF_3$ wherein o is a number of from about 0 to about 25 and p is a number of from about 1 to about 25.

Embodiments also include a fuser member comprising a substrate; an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a blend comprising a mercapto functional release agent and a fluorosilicone release agent having the following formula I:

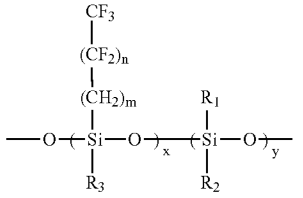

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula $—(CH_2)_o—(CF_2)_p—CF_3$ wherein o is a number of from about 0 to about 25 and p is a number of from about 1 to about 25.

Embodiments further include an image forming apparatus for forming images on a recording medium comprising a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a) a substrate; and b) an outer layer comprising a fluoropolymer and a release agent material coating on the outer layer, wherein the release agent material coating comprises a blend comprising a mercapto functional release agent and a fluorinated silicone release agent having the following Formula I:

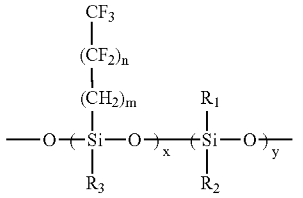

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane chain, and a fluoro-chain of the formula $—(CH_2)_o—(CF_2)_p—CF_3$ wherein o is a number of from about 0 to about 25 and p is a number of from about 1 to about 25.

BRIEF DESCRIPTION OF THE DRAWINGS

For a better understanding of the present invention, reference may be had to the accompanying figures.

DETAILED DESCRIPTION

Herein is disclosed a release agent oil composition, for example, containing a mixture of a mercapto functionalized silicone oil compound and a fluorosilicone oil having a certain formula. The release agent is effective in volatile emission control or suppression of, for example, fluoroaldehydes at elevated or operating temperatures from the fuser oil blend composition. The release agent oil composition and fusing method employing the composition limits or eliminates the level of fluoroaldehyde volatile emission arising from oxidative and thermal degradative processes.

Figure 1:
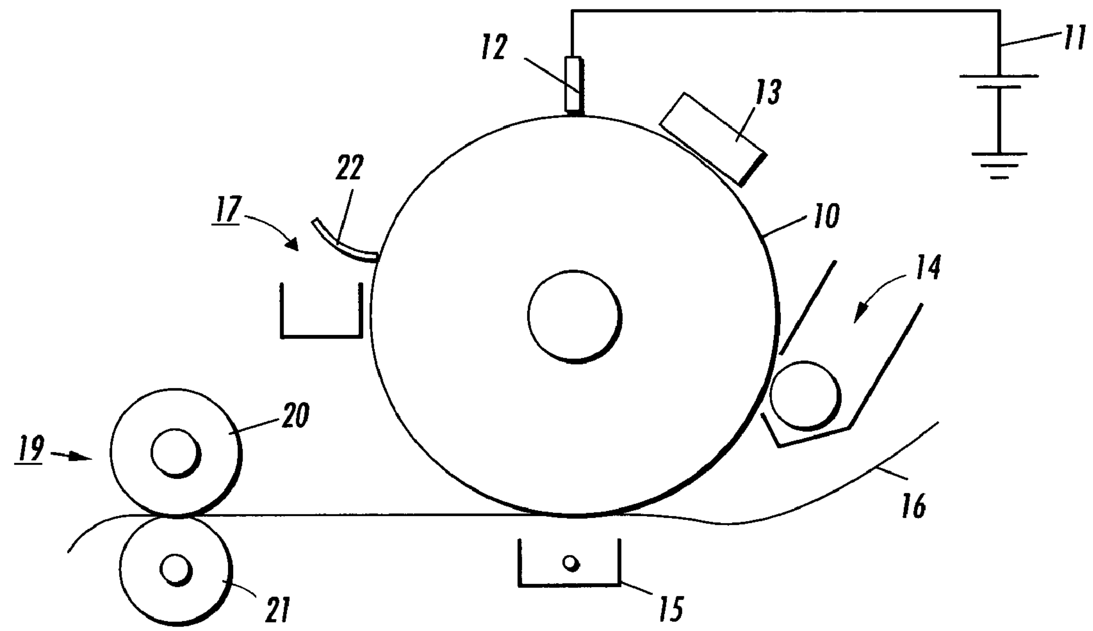
FIG. 1 is a schematic illustration of an embodiment of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to fusing station 19, depicted in FIG.

1 as fuser roll 20 and pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure members, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
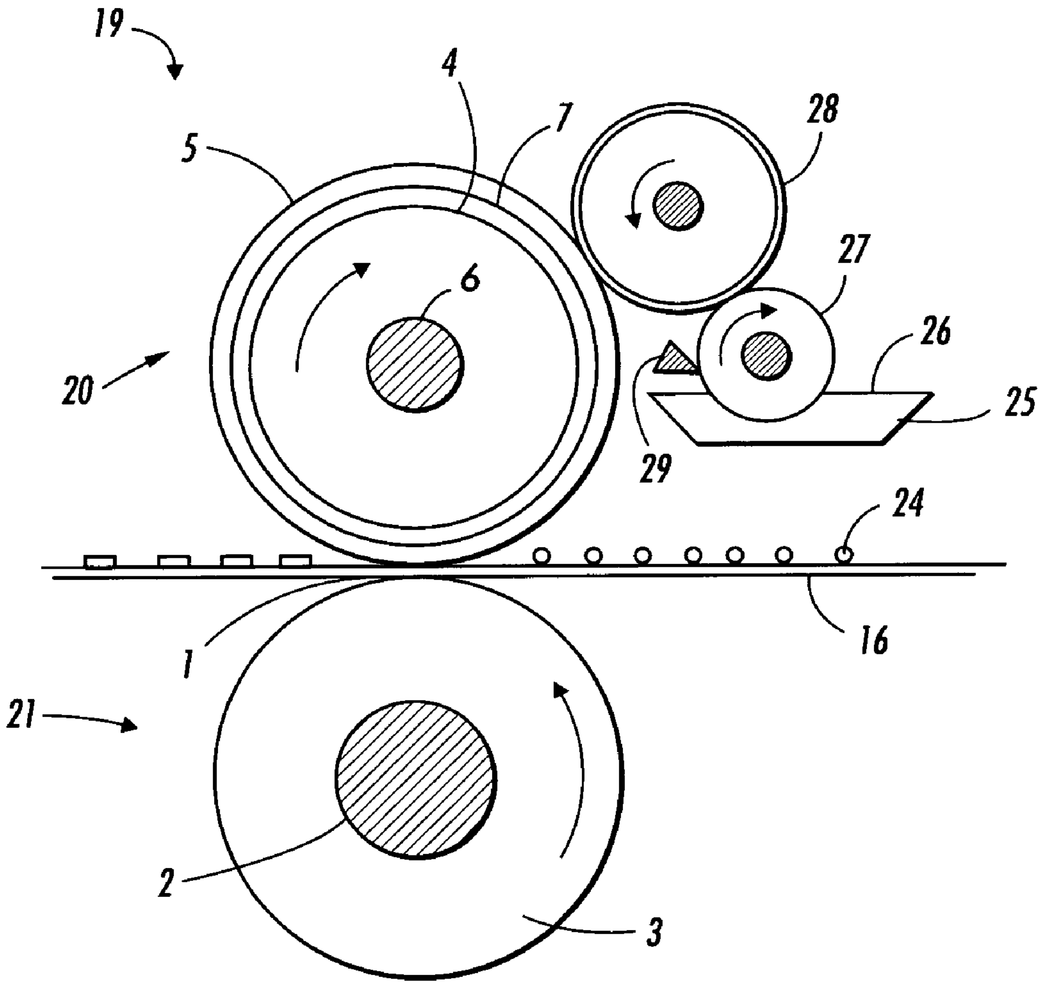
FIG. 2 is an enlarged view of an embodiment of a fuser subsystem, showing fuser and pressure rollers.

Referring to FIG. 2, an embodiment of a fusing station 19 is depicted with an embodiment of a fuser roll 20 comprising polymer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26, which may be a solid or liquid at room temperature, but is a fluid at operating temperatures, and, can be a a functional or non-functional silicone oil or mixtures thereof. The pressure member 21 can also optionally include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicron thickness to thicknesses of several microns of release fluid. Thus, by metering device 29, from about 0.1 to about 2 microns or greater thicknesses of release fluid can be applied to the surface of polymer or elastomer 5.

Figure 3:
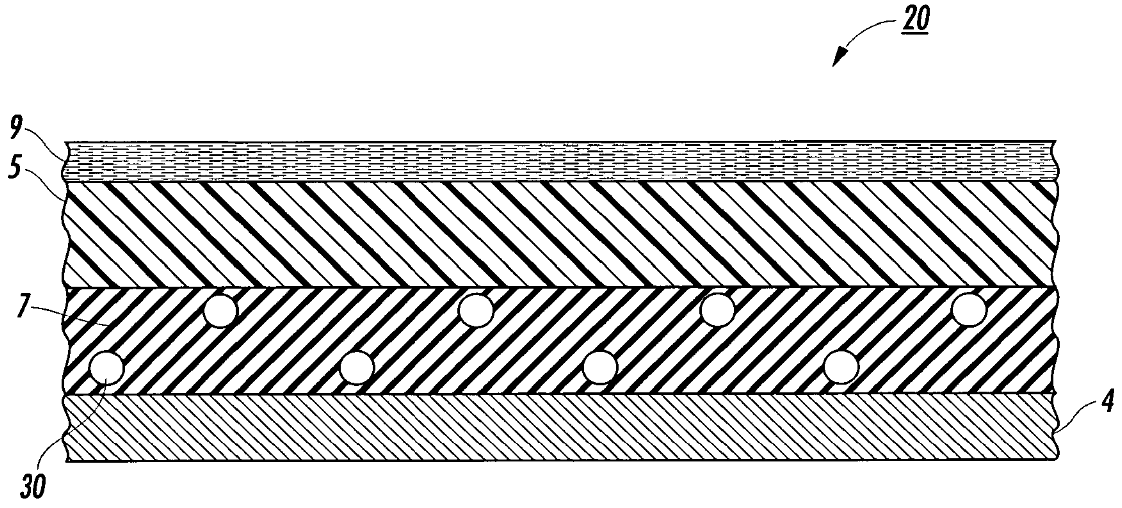
FIG. 3 is an enlarged, side view of an embodiment of a fuser member, showing a fuser member with a substrate, intermediate layer, outer layer, and release agent coating layer.

FIG. 3 is an enlarged schematic view of an embodiment of a fuser member, demonstrating the various possible layers. As shown in FIG. 3, substrate 4 has intermediate layer 7 thereon. Intermediate layer 7 can be, for example, a rubber such as silicone rubber or other suitable rubber material. On intermediate layer 7 is positioned outer layer 5 comprising a fluoroelastomer as described below. Positioned on outer fluoroelastomer layer 5 is outermost liquid fluorosilicone release layer 9.

In embodiments, a fluorosilicone is used in combination with a mercapto functional release agent, such as a mercapto functional release agent, in order to reduce or eliminate fluoroaldehyde emissions. In embodiments, the fluorosilicone has the following formula:

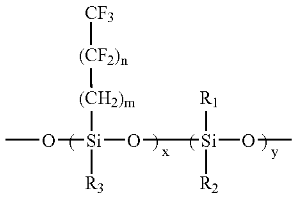

wherein m is a number of from about 0 to about 25, or from about 1 to about 15, or from about 1 to about 10, and n is a number of from about 1 to about 25, or from about 1 to about 15, or from about 2 to about 12; x/(x+y) is from about 1 percent to about 100 percent, or from about 2 to about 80 percent, or from about 4 to about 20 percent; $R_1$ and $R_2$ are selected from the group consisting of alkyl having from about 1 to about 25 carbons such as methyl, ethyl, propyl, butyl, and the like; aryl such as phenyl, biphenyl, and the like; arylalkyl having from about 1 to about 25 carbons such as methylphenyl, ethylphenyl, propylphenyl, and the like; and alkylamino groups having from about 1 to about 25 carbons, such as methyl amino, ethyl amino, propyl amino, and the like; and $R_3$ is selected from the group consisting of alkyl such as methyl, ethyl, and the like; aryl such as phenyl, biphenyl and the like; arylalkyl such as methylphenyl, ethylphenyl, and the like; alkylamino such as methylamino, ethylamino, propylamino, butylamino and the like; a polyorganosiloxane chain such as polydialkylsiloxane, polydimethylsiloxane, and the like; and a fluoro-chain of the formula $-(CH_2)_o-(CF_2)_p-CF_3$ wherein o is a number of from about 0 to about 25, or from about 1 to about 15, and p is a number of from about 1 to about 25, or from about 4 to about 15, or from about 5 to about 10. In embodiments, m is 2, and $R_1$, $R_2$ and $R_3$ are selected from the group consisting of alkyl, aryl, arylalkyl and alkylamino groups. In embodiments, the fluorosilicone comprises tridecafluorooctane functional groups. In embodiments, the fluorosilicone comprises 3,3,4,4,5,5,6,6,7,7,8,8,8-tridecafluorooctane functional groups.

In embodiments, the fluorosilicone is blended or mixed with a mercapto functional release agent. A mercapto oil is used in combination with the fluorofluid in order to reduce or eliminate fluoroaldehyde emissions.

A mercapto oil can used in combination with the fluorofluid in order to reduce or eliminate fluoroaldehyde emissions.

Suitable and representative mercapto functional siloxanes include those having the following formulas:

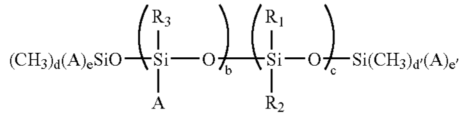

wherein A represents $-R_4-X$, wherein $R_4$ represents an alkyl group having from about 1 to about 10 carbons, X represents $-SH$; $R_1$ and $R_2$ are the same or different and each is selected from the group consisting of an alkyl having from about 1 to about 25 carbons, an aryl having from about 4 to about 10 carbons, and an arylalkyl; $R_3$ is selected from the group consisting of an alkyl having from about 1 to about 25 carbons, an aryl having from about 4 to about 10 carbons, an arylalkyl, and a substituted diorganosiloxane chain having from about 1 to about 500 siloxane units; b and c are numbers and are the same or different and each satisfy the conditions of $1 \leqq b \leqq 10$ and $10 \leqq c \leqq 1,000$; d and d' are numbers and are the same or different and are 2 or 3, and e and e' are numbers and are the same or different and are 0 or 1 and satisfy the conditions that d+e=3 and d'+e'=3.

A nonfunctional oil, as used herein, refers to oils that do not interact or chemically react with the surface of the fuser member or with fillers on the surface. A functional oil, as used herein, refers to a release agent having functional groups which chemically react with the fillers present on the surface of the fuser member, so as to reduce the surface energy of the fillers so as to provide better release of toner particles from the surface of the fuser member. If the surface energy is not reduced, the toner particles will tend to adhere to the fuser roll surface or to filler particles on the surface of the fuser roll, which will result in copy quality defects.

The fuser oil composition comprises from about 1 to about 15 weight percent of mercapto functional oil, or from about 5 to about 10 weight percent mercapto functional oil, and from about 85 to about 99 weight percent, or from about 90 to about 95 weight percent fluorosilicone oil.

The release agent oil compositions may be applied to the fusing surface of the fuser member, such as a fuser roller, fuser belt, fuser film, or the like using known application methodologies such as a roller applicator or by wicking action. The amount of the release agent oil applied to the fuser member and subsequently transferred to the receiver sheet is in the range from about 0.011 to about 6 microliters per sheet, or from about 0.01 to about 3 microliters per sheet for best release and most efficient use of the oil composition.

Examples of the outer surface of the fuser system members include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of vinylidenefluoride and hexafluoropropylene; 2) terpolymers of vinylidenefluoride, hexafluoropropylene and tetrafluoroethylene; and 3) tetrapolymers of vinylidenefluoride, hexafluoropropylene, tetrafluoroethylene and cure site monomer, are known commercially under various designations as VITON A®, VITON B®, VITON E®, VITON E® 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (L11900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of fluoroelastomers useful for the surfaces of fuser members include fluoroelastomers, such as fluoroelastomers of vinylidenefluoride-based fluoroelastomers, hexafluoropropylene and tetrafluoroethylene as comonomers. There are also copolymers of one of vinylidenefluoride, hexafluoropropylene and tetrafluoroethylene. Examples of three known fluoroelastomers are (1) a class of copolymers of two of vinylidenefluoride, hexafluoropropylene and tetrafluoroethylene, such as those known commercially as VITON A® (2) a class of terpolymers of vinylidenefluoride, hexafluoropropylene and tetrafluoroethylene known commercially as VITON B® and (3) a class of tetrapolymers of vinylidenefluoride, hexafluoropropylene, tetrafluoroethylene and cure site monomer known commercially as VITON GH® or VITON GF®.

The fluoroelastomers VITON GH® and VITON GF® have relatively low amounts of vinylidenefluoride. The VITON GF® and Viton GH® have about 35 weight percent of vinylidenefluoride, about 34 weight percent of hexafluoropropylene and about 29 weight percent of tetrafluoroethylene with about 2 weight percent cure site monomer.

Other examples of outer layers include fluoropolymers such as polytetrafluoroethylene (PTFE), fluorinated ethylenepropylene copolymer (FEP), polyfluoroalkoxy polytetrafluoroethylene (PFA Teflon), ethylene chlorotrifluoro ethylene (ECTFE), ethylene tetrafluoroethylene (ETFE), polytetrafluoroethylene perfluoromethylvinylether copolymer (MFA), and the like, and mixtures or polymers thereof.

The amount of fluoroelastomer compound in solution in the outer layer solutions, in weight percent total solids, is from about 10 to about 25 percent, or from about 16 to about 22 percent by weight of total solids. Total solids as used herein includes the amount of fluoroelastomer, dehydrofluorinating agent and optional adjuvants and fillers, including metal oxide fillers.

In addition to the fluoroelastomer, the outer layer may comprise a fluoropolymer or other fluoroelastomer blended with the above fluoroelastomer. Examples of suitable polymer blends include the above fluoroelastomer, blended with a fluoropolymer selected from the group consisting of polytetrafluoroethylene and perfluoroalkoxy. The fluoroelastomer can also be blended with non-fluorinated ethylene or non-fluorinated propylene.

An inorganic particulate filler may be used in connection with the fluoroelastomer outer layer, in order to provide anchoring sites for the functional groups of the silicone fuser agent. However, a filler is not necessary for use with the present fluorosilicone release agent. In fact, dispensing with a metal oxide increases fuser life and decreases fabrication costs. Examples of suitable fillers include a metal-containing filler, such as a metal, metal alloy, metal oxide, metal salt or other metal compound. The general classes of metals which are applicable to the present invention include those metals of Groups 1b, 2a, 2b, 3a, 3b, 4a, 4b, 5a, 5b, 6b, 7b, 8 and the rare earth elements of the Periodic Table. The filler can be an oxide of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel and alloys thereof. Other specific examples include inorganic particulate fillers are aluminum oxide and cupric oxide. Other examples include reinforcing and non-reinforcing calcined alumina and tabular alumina respectively.

The thickness of the outer fluoroelastomer surface layer of the fuser member herein is from about 10 to about 250 micrometers, or from about 15 to about 100 micrometers.

Optional intermediate adhesive layers and/or intermediate polymer or elastomer layers may be applied to achieve desired properties and performance objectives. The intermediate layer may be present between the substrate and the outer fluoroelastomer surface. An adhesive intermediate layer may be selected from, for example, epoxy resins and polysiloxanes. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182.

There may be provided an adhesive layer between the substrate and the intermediate layer. There may also be an adhesive layer between the intermediate layer and the outer layer. In the absence of an intermediate layer, the fluoroelastomer layer may be bonded to the substrate via an adhesive layer.

The thickness of the intermediate layer is from about 0.5 to about 20 mm, or from about 1 to about 5 mm.

The release agents or fusing oils described herein are provided onto the outer layer of the fuser member via a delivery mechanism such as a delivery roll. The delivery roll is partially immersed in a sump, which houses the fuser oil or release agent. The fluorosilicone oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

A fluorinated organopolydimethylsiloxane containing 5.6 mol % pendant tridecafluorooctyl fluorinated groups was compared with (2) the same fluorinated organopolydimethylsiloxane with PC085 (chloroplatinic acid), (3) the same fluorinated organopolydimethylsiloxane with 3.1 wt % mercaptopropyl functional fluid (Xerox Fuser Agent), (4) the same fluorinated organopolydimethylsiloxane with 7.4 wt % mercaptopropyl functional fluid (Xerox Fuser Agent) and (5) the same fluorinated organopolydimethylsiloxane with 10% mercaptopropyl functional fluid (Xerox Fuser Agent).

Figure 5:
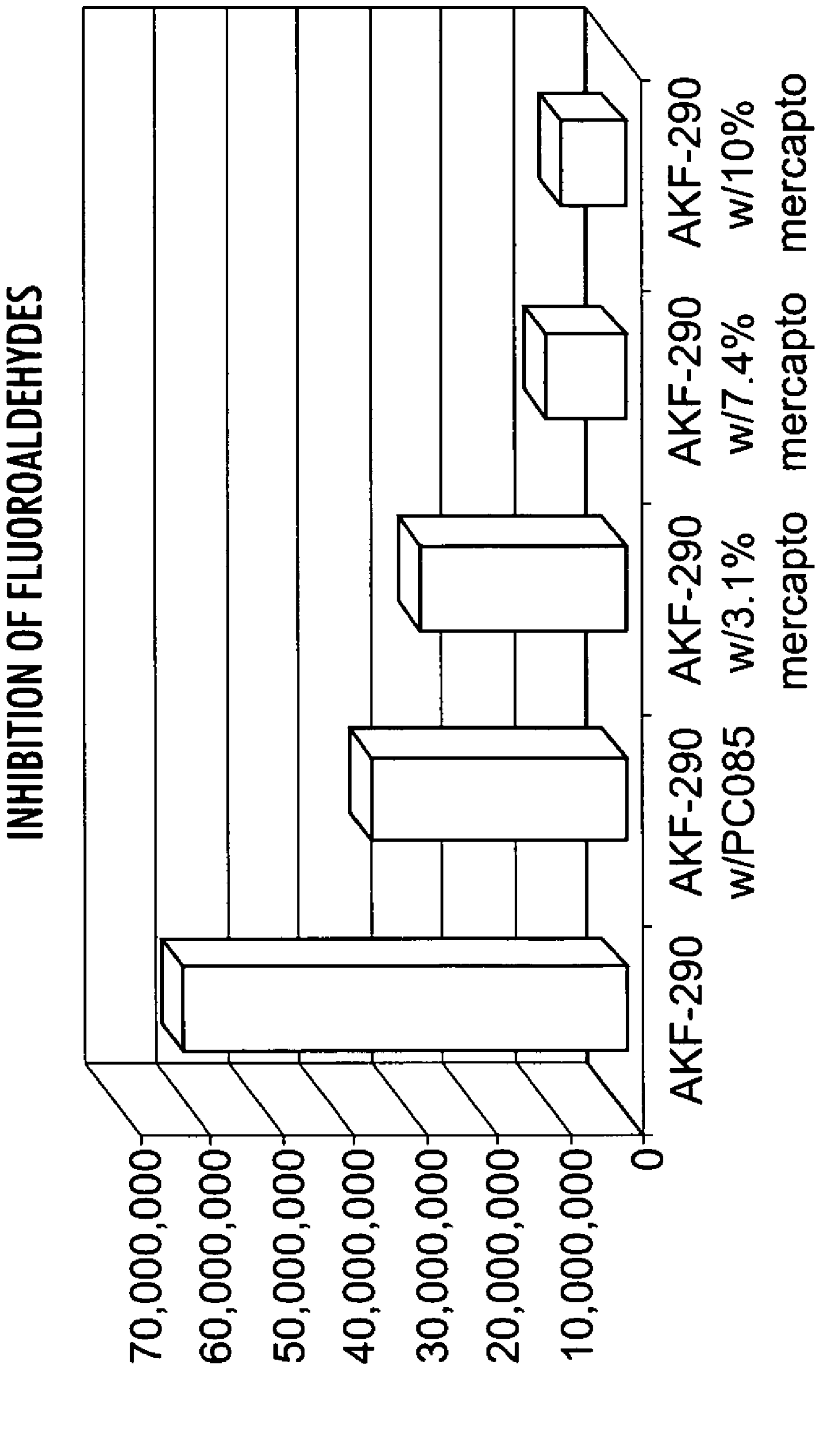
FIG. 5 is a bar graph of the relative amounts of fluoroaldehydes emitted for various release agents.

FIG. 5 is a bar graph of the relative amounts of fluoroaldehydes emitted upon heating for 30 minutes at 260° C. for the above five different fluids.

Figure 4:
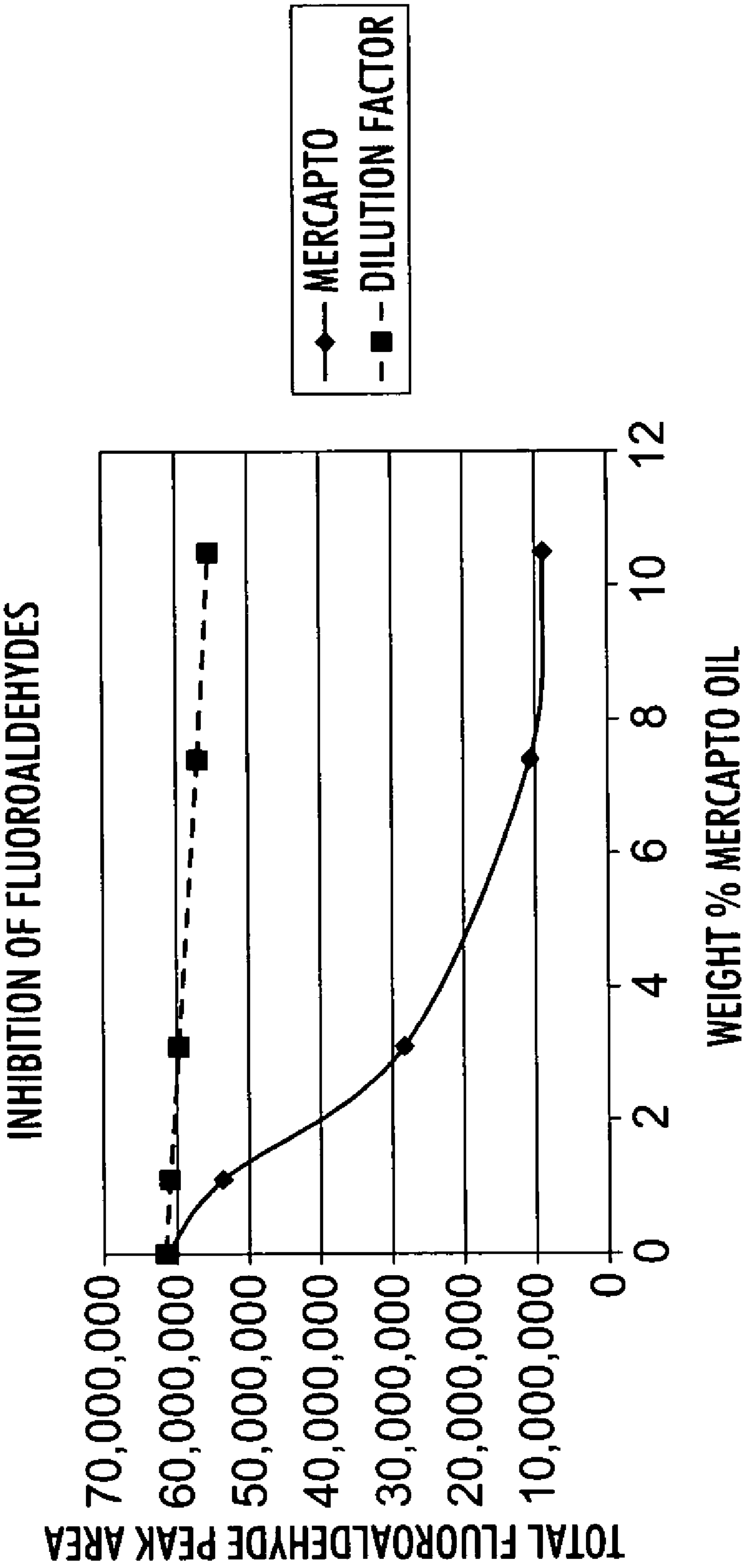
FIG. 4 is a graph of total fluoroaldehyde peak area versus weight percent mercapto oil.

FIG. 4 is a graph of total fluoroaldehyde peak area from the Headspace Gas Chromatography/Mass spectra of the M/Z 95 base ion for the fluoroaldehyde structures emitted versus weight percent mercapto oil, showing the inhibition of fluoroaldehydes upon heating for 30 minutes at 260° C. in a closed container.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

What is claimed is:

1. A fuser member comprising a substrate, an outer layer comprising a fluoropolymer, and a release agent material coating on the outer layer, wherein the release agent material coating comprises (a) a blend comprising a mercapto functional release agent having the following formula II:

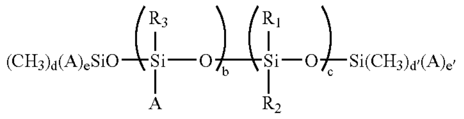

wherein A represents —$R_4$—X, wherein $R_4$ represents an alkyl group having from about 1 to about 10 carbons, X represents —SH; $R_1$ and $R_2$ are the same or different and each is selected from the group consisting of an alkyl having from about 1 to about 25 carbons, an aryl having from about 4 to about 10 carbons, and an arylalkyl; $R_3$ is selected from the group consisting of an alkyl having from about 1 to about 25 carbons, an aryl having from about 4 to about 10 carbons, an arylalkyl, and a substituted diorganosiloxane chain having from about 1 to about 500 siloxane units; b and c are numbers and are the same or different and each satisfy the conditions of $1 \leqq b \leqq 10$ and $10 \leqq c \leqq 1{,}000$; d and d' are numbers and are the same or different and are 2 or 3, and e and e' are numbers and are the same or different and are 0 or 1 and satisfy the conditions that d+e=3 and d'+e'=3 and (b) a fluorinated silicone release agent having the following Formula I:

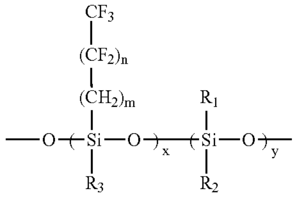

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula $-(CH_2)_o-(CF_2)_p-CF_3$ wherein o is a number of from about 0 to about 25 and p is a number of from about 1 to about 25.

2. A fuser member in accordance with claim 1, wherein in formula I, p is a number of from about 4 to about 15.

3. A fuser member in accordance with claim 2, wherein in formula I, p is a number of from about 5 to about 10.

4. A fuser member in accordance with claim 1, wherein said fluorosilicone release agent comprises tridecafluorooctane functional groups.

5. A fuser member in accordance with claim 4, wherein said tridecafluorooctane functional groups are 3,3,4,4,5,5,6,6,7,7,8,8,8-tridecafluorooctane functional groups.

6. A fuser member in accordance with claim 1, wherein m is a number of from about 1 to about 15.

7. A fuser member in accordance with claim 1, wherein n is a number of from about 1 to about 15.

8. A fuser member in accordance with claim 1, wherein x/(x+y) is from about 2 percent to about 80 percent.

9. A fuser member in accordance with claim 1, wherein o is a number of from about 1 to about 15.

10. A fuser member in accordance with claim 1, wherein said fluoropolymer is a fluoroelastomer selected from the group consisting of a) copolymers of two of vinylidene fluoride, hexafluoropropylene, and tetrafluoroethylene; b) terpolymers of vinylidene fluoride, hexafluoropropylene, and tetrafluoroethylene; and c) tetrapolymers of vinylidene fluoride, hexafluoropropylene, tetrafluoroethylene, and a cure site monomer.

11. A fuser member in accordance with claim 10, wherein the fluoroelastomer comprises about 35 weight percent of vinylidenefluoride, about 34 weight percent of hexafluoropropylene, about 29 weight percent of tetrafluoroethylene, and about 2 weight percent cure site monomer.

12. A fuser member in accordance with claim 1, wherein said fluoropolymer is selected from the group consisting of polytetrafluoroethylene, fluorinated ethylenepropylene copolymer, polyfluoroalkoxy polytetrafluoroethylene, ethylene chlorotrifluoro ethylene, ethylene tetrafluoroethylene, polytetrafluoroethylene perfluoromethylvinylether copolymer, and mixtures thereof.

13. A fuser member in accordance with claim 1, wherein said blend comprises the mercapto functional release agent of formula II in an amount of from about 1 to about 15 weight percent.

14. A fuser member in accordance with claim 1, wherein said blend comprises the fluorosilicone release agent of formula I in an amount of from about 99 to about 85 weight percent.

15. A fuser member in accordance with claim 1, further comprising an intermediate layer positioned between the substrate and the outer layer.

16. A fuser member in accordance with claim 15, wherein the intermediate layer comprises silicone rubber.

17. A fuser member comprising a substrate; an outer layer comprising a fluoroelastomer selected from the group consisting of a) copolymers of two of vinylidene fluoride, hexafluoropropylene and tetrafluoroethylene; b) terpolymers of vinylidene fluoride, hexafluoropropylene and tetrafluoroethylene; and c) tetrapolymers of vinylidene fluoride, hexafluoropropylene, tetrafluoroethylene, and a cure site monomer; and a release agent material coating on the outer layer, wherein the release agent material coating comprises a blend comprising a mercapto functional release agent having the following formula II:

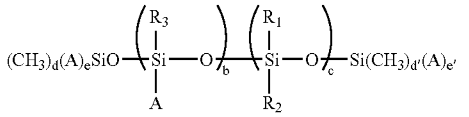

wherein A represents —$R_4$—X, wherein $R_4$ represents an alkyl group having from about 1 to about 10 carbons, X represents —SH; $R_1$ and $R_2$ are the same or different and each is selected from the group consisting of an alkyl having from about 1 to about 25 carbons, an aryl having from about 4 to about 10 carbons, and an arylalkyl; $R_3$ is selected from the group consisting of an alkyl having from about 1 to about 25 carbons, an aryl having from about 4 to about 10 carbons, an arylalkyl, and a substituted diorganosiloxane chain having from about 1 to about 500 siloxane units; b and c are numbers and are the same or different and each satisfy the conditions of $1 \leqq b \leqq 10$ and $10 \leqq c \leqq 1{,}000$; d and d' are numbers and are the same or different and are 2 or 3, and e and e' are numbers and are the same or different and are 0 or 1 and satisfy the conditions that d+e=3 and d'+e'=3 and (b) a fluorinated silicone release agent having the following Formula I:

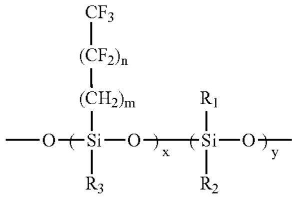

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula $—(CH_2)_o—(CF_2)_p—CF_3$ wherein o is a number of from about 0 to about 25 and p is a number of from about 1 to about 25.

18. An image forming apparatus for forming images on a recording medium comprising: a charge-retentive surface to receive an electrostatic latent image thereon; a development component to apply a developer material to the charge-retentive surface to develop the electrostatic latent image to form a developed image on the charge retentive surface; a transfer component to transfer the developed image from the charge retentive surface to a copy substrate; and a fuser member component to fuse the transferred developed image to the copy substrate, wherein the fuser member comprises a) a substrate; and b) an outer layer comprising a fluoropolymer and a release agent material coating on the outer layer, wherein the release agent material coating comprises a blend comprising a mercapto functional release agent having the following formula II:

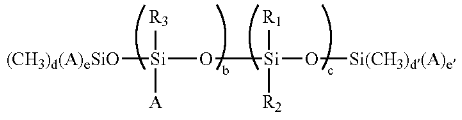

wherein A represents —$R_4$—X, wherein $R_4$ represents an alkyl group having from about 1 to about 10 carbons, X represents —SH; $R_1$ and $R_2$ are the same or different and each is selected from the group consisting of an alkyl having from about 1 to about 25 carbons, an aryl having from about 4 to about 10 carbons, and an arylalkyl: $R_3$ is selected from the group consisting of an alkyl having from about 1 to about 25 carbons, an aryl having from about 4 to about 10 carbons, an arylalkyl, and a substituted diorganosiloxane chain having from about 1 to about 500 siloxane units; b and c are numbers and are the same or different and each satisfy the conditions of $1 \leqq b \leqq 10$ and $10 \leqq c \leqq 1{,}000$; d and d' are numbers and are the same or different and are 2 or 3, and e and e' are numbers and are the same or different and are 0 or 1 and satisfy the conditions that d+e=3 and d'+e'=3 and (b) a fluorinated silicone release agent having the following Formula I:

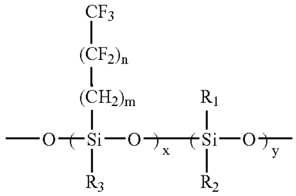

wherein m is a number of from about 0 to about 25 and n is a number of from about 1 to about 25; x/(x+y) is from about 1 percent to about 100 percent; $R_1$ and $R_2$ are selected from the group consisting of alkyl, aryl, arylalkyl, and alkylamino groups; and $R_3$ is selected from the group consisting of alkyl, aryl, arylalkyl, alkylamino, a polyorganosiloxane, and a fluoro-chain of the formula $—(CH_2)_o—(CF_2)_p—CF_3$ wherein o is a number of from about 0 to about 25 and p is a number of from about 1 to about 25.

* * * * *